United States Patent
Liu et al.

(10) Patent No.: US 12,457,539 B2
(45) Date of Patent: Oct. 28, 2025

(54) NETWORK RESOURCE MANAGEMENT AND LINK ADAPTATION BASED ON USER MOBILITY PROFILE

(71) Applicant: T-MOBILE INNOVATIONS LLC, Overland Park, KS (US)

(72) Inventors: Jun Liu, Sammamish, WA (US); Egil Arnfinn Gronstad, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 404 days.

(21) Appl. No.: 17/962,864

(22) Filed: Oct. 10, 2022

(65) Prior Publication Data
US 2024/0121690 A1    Apr. 11, 2024

(51) Int. Cl.
*H04W 36/32* (2009.01)
*H04W 36/00* (2009.01)

(52) U.S. Cl.
CPC ..... *H04W 36/32* (2013.01); *H04W 36/00837* (2018.08)

(58) Field of Classification Search
CPC .............. H04W 36/32; H04W 36/00837
USPC ........................................................ 370/331
See application file for complete search history.

(56) References Cited

U.S. PATENT DOCUMENTS

| | | | |
|---|---|---|---|
| 2023/0328580 A1* | 10/2023 | Pateromichelakis | H04W 28/0268 370/328 |
| 2024/0089745 A1* | 3/2024 | Vivanco | H04W 16/28 |

* cited by examiner

*Primary Examiner* — Faisal Choudhury
(74) *Attorney, Agent, or Firm* — Shook, Hardy & Bacon L.L.P.

(57) ABSTRACT

Systems and methods for adapting one or more network resources of a telecommunication network based on mobility data include a cell site communicatively coupled to a network management system and a fixed device. The network management system is structured to receive mobility data corresponding to a fixed location served by a telecommunication network, the telecommunication network including a fixed wireless network, determine a mobility profile in real-time or near real-time based on the mobility data, and generate a command to adapt one or more network resources based on the mobility profile.

19 Claims, 4 Drawing Sheets

NETWORK RESOURCE MANAGEMENT AND LINK ADAPTATION BASED ON USER MOBILITY PROFILE

SUMMARY

The present disclosure is directed, in part, to adapting one or more network resources of a telecommunication network based on mobility data, substantially as shown in and/or described in connection with at least one of the figures, and as set forth more completely in the claims.

In aspects set forth herein, a user device is connected to a telecommunication network that includes a fixed wireless network (e.g., a Wi-Fi network). Mobility data is usually received responsive to the connection of a radio signal to the user device within a certain distance to the fixed wireless network. Typically, the network resources are managed according to a mobility profile that is based on mobility data of a mobile smartphone user. However, here, a network management system receives mobility data corresponding to a fixed device, fixed location, and a telecommunication network and determines a mobility profile in real-time or near real-time based on the mobility data and one or more network parameters to adapt network resource(s) which saves the system signaling overhead and ensures radio link quality.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
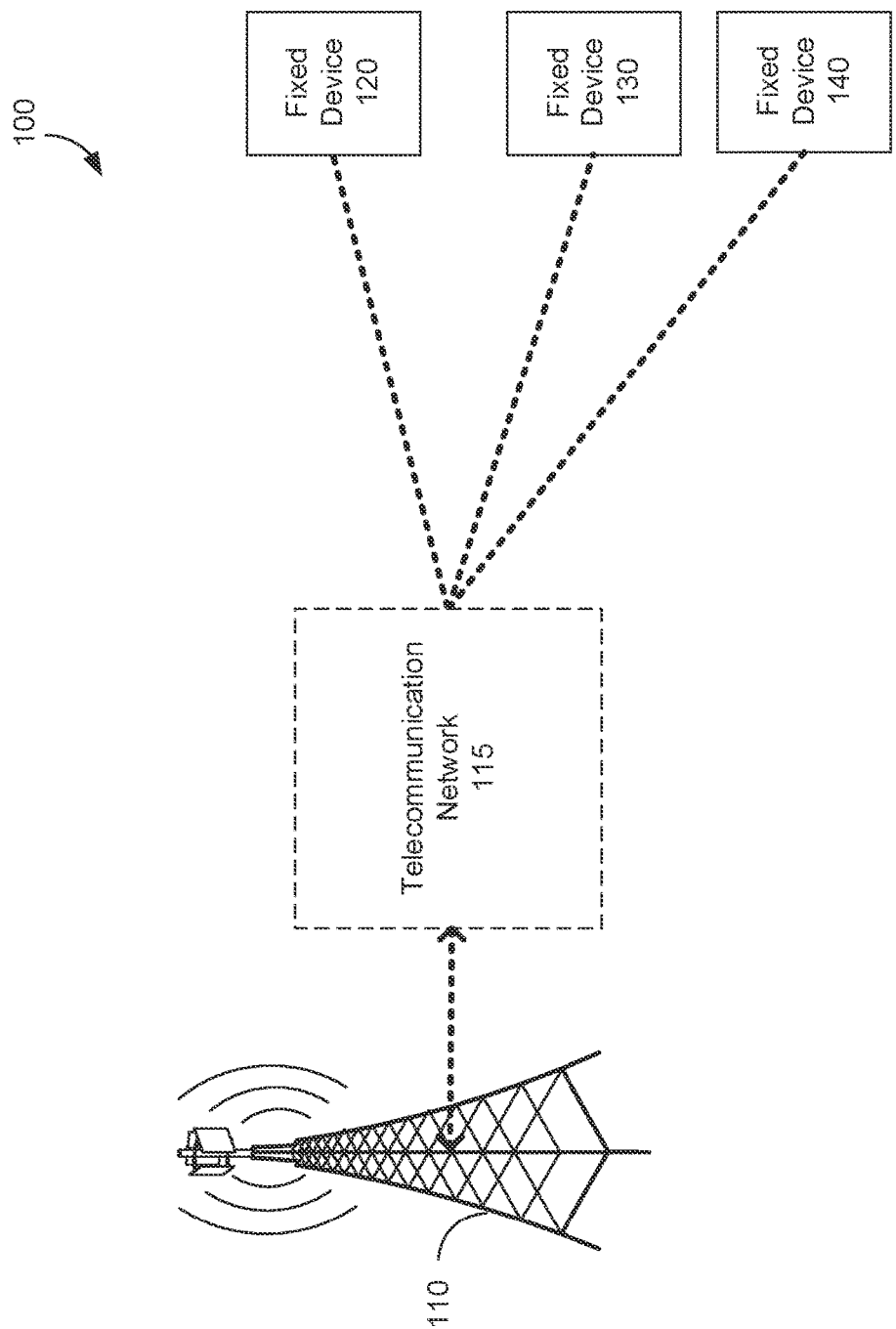
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for adapting one or more network resources of a telecommunication network based on mobility data. Mobility data corresponding to a fixed location served by a telecommunication network is received. A mobility profile is determined in real-time or near real-time based on the mobility data and one or more network parameters comprising at least one cell parameter, handover parameter, or signal parameter. A command to adapt one or more network resources is generated based on the mobility profile.

Advantageously, adapting one or more network resources of a telecommunication network based on the mobility data saves the system signaling overhead associated with the adaptive beam forming.

In one aspect, a method is provided for adapting one or more network resources of a telecommunication network based on mobility data. The method includes receiving, by a network management system communicatively coupled to at least one cell site and fixed device, mobility data corresponding to a fixed location served by a telecommunication network. The method also includes determining a mobility profile in real-time or near real-time based on the mobility data and one or more network parameters including at least one cell parameter, handover parameter, or signal parameter. The method further includes generating a command to adapt one or more network resources based on the mobility profile.

In another aspect, a computer-readable storage media having computer-executable instructions embodied thereon is provided that, when executed by one or more processors, cause the processors to perform various steps. The processors are caused to receive, by a network management system communicatively coupled to at least one cell site and fixed device, mobility data corresponding to a fixed location served by a telecommunication network. The processors are also caused to determine a mobility profile in real-time or near real-time based on the mobility data. The processors are further caused to generate a command to adapt one or more network resources based on the mobility profile.

In yet another aspect, a system is provided for adapting one or more network resources of a telecommunication network based on mobility data. The system includes a cell site communicatively coupled to a network management system and a fixed device. The network management system receives mobility data corresponding to a fixed location served by a telecommunication network, the telecommunication network including a fixed wireless network. The network management system also determines a mobility profile in real-time or near real-time based on the mobility data. The network management system further generates a command to adapt one or more network resources based on the mobility profile.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, non-transitory and transitory media, removable and non-removable media, and contemplate media readable by a database, a switch, and various other network devices. Computer-readable media includes media implemented in any way for storing information. Examples of stored information include computer-useable instructions, data structures, programmatic circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "user equipment," "UE," "user device," and "fixed device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G or 6G and having backward compatibility with prior access technologies, current UE capable of using 5G or 6G and lacking backward compatibility with prior access technologies, and legacy UE that is not capable of using 5G or 6G.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connect to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more fixed devices 120, 130, and 140. In some embodiments, the network environment 100 may include a telecom network (e.g., a telecommunication network 115 such as, but not limited to, a fixed wireless network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecommunication network 115 (e.g., a fixed wireless network such as, but not limited to, a Wi-Fi network) included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., the user devices such as the fixed devices 120, 130, and 140) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, a user device may connect to or otherwise access a 4G, LTE, 5G, or any other suitable network. In the stand alone mode, the telecom network may take the form of a 5G, 6G, or any other suitable network.

In some embodiments, the network environment 100 may include one or more nodes communicatively coupled to one or more user devices such that the node(s) may transmit to and receive requests and/or data from the user device(s). The one or more nodes may include a Next Generation Node B (e.g., gNodeB or gNB) or any other suitable node. The one or more nodes may correspond to one or more frequency bands within which the user device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s) (e.g., the fixed devices, 120, 130, and/or 140).

In some embodiments, the fixed device 120, 130, and/or 140 may take the form of a wireless or mobile device capable of communication via the network environment 100. For example, the fixed device 120 may take the form of a laptop device capable of communication via a telecom network such as, but not limited to, a wireless telecommunication network. In this regard, the fixed device(s) may be any computing device that communicates by way of a network, for example, a Wi-Fi, WiMAX, 4G, LTE, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. 5G, 6G, voice, location, data, etc.) to one or more user devices. For example, the user devices 120 and 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
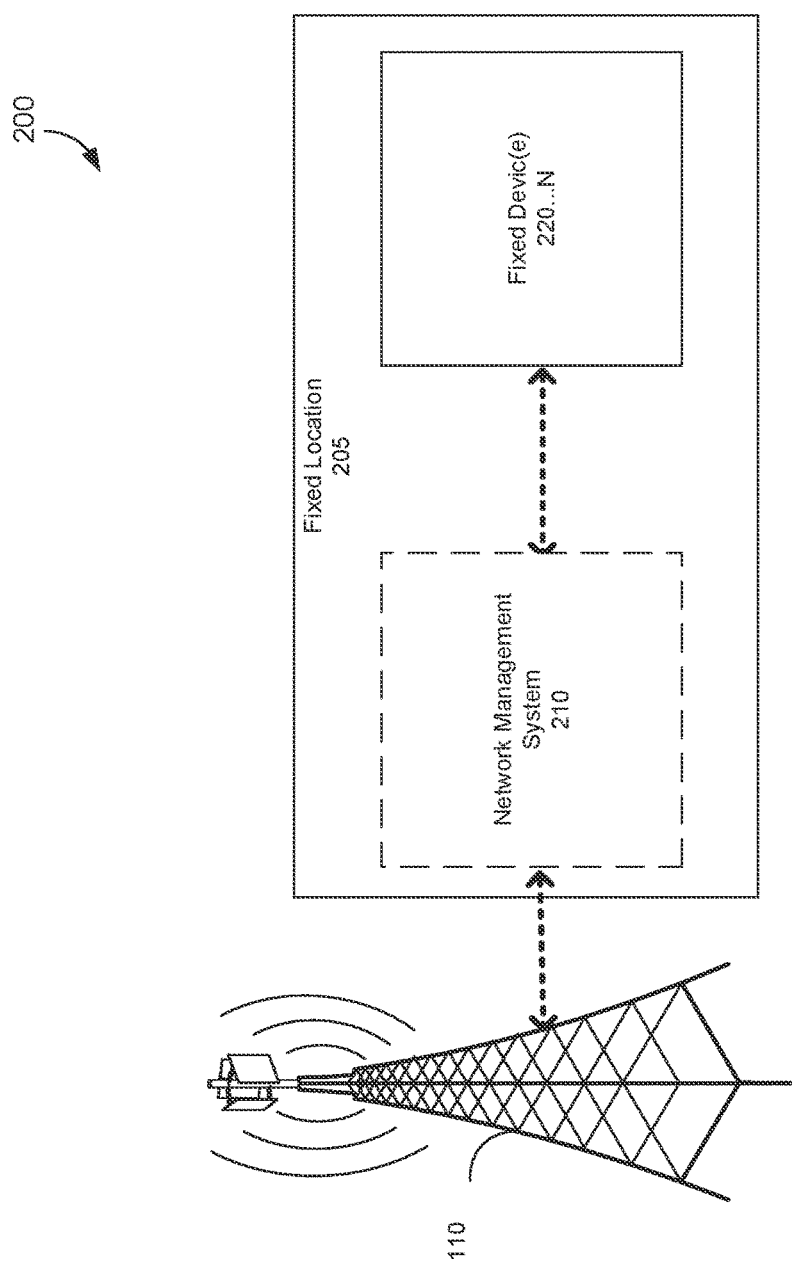
FIG. 2 is a diagram of a network environment including network management system in accordance with an example embodiment.

FIG. 2 is a diagram of the network environment 200 (e.g., a telecommunication environment such as, but not limited to, a fixed wireless environment) according to an example embodiment. In the present embodiment, the network environment 200 includes the cell site 110, fixed location 205, network management system 210, and fixed devices 220 . . . N. Although some of the components in the network environment 200 are depicted as single components (e.g., a single network management system), in some embodiments, the network environment 200 may include a plurality of such components. The network management system 210 may be included within the cell site 110, external to the cell site 110, and/or otherwise communicatively coupled to the cell site 110 directly or indirectly.

In some embodiments, the network management system (e.g., the network management system 210) may receive mobility data corresponding to a fixed location served by a telecommunication network. For example, the network management system may receive (e.g., collect) or otherwise retrieve mobility data (e.g., user mobility data) corresponding to a fixed location (e.g., the fixed location 205 such as a residential location, home, commercial location, business, office, and/or any other suitable area within a distance of a fixed wireless network as described herein). One cell site (e.g., the cell site 110) may serve many fixed devices (e.g., user devices such as a smartphone, laptop, desktop, computer, smart television, smart thermostat, etc.) such that there may be N number of fixed devices trying to access the telecommunication network. In some embodiments, the network management system may be communicatively coupled to a plurality of cell sites and one or more fixed devices. The telecommunication network may include a fixed wireless network and/or one or more fixed devices communicatively coupled based on the Internet of Things (IoT). The cell site may be operable based on a RAN (Radio Access Network) network. The RAN network may be based on a network type (e.g., 2G, 3G, 4G, 5G, internet of things (IoT), etc.), frequency, baseband type, vendor input, and/or any other suitable RAN network or parameter(s).

In some embodiments, the network management system (e.g., the network management system 210) may determine a mobility profile in real-time or near real-time based on the mobility data. In this regard, the network management system may aggregate the mobility data. The mobility profile may correspond to one or more network parameters. The network management system may learn and/or analyze the one or more network parameters. In some examples, the network management system may aggregate the one or more network parameters associated with the at least one fixed device (e.g., the fixed device 220). In some embodiments, the network parameter(s) may be aggregated and/or analyzed based on a single cell site or a plurality of cell sites. The network management system may analyze the mobility data according to a programmatic algorithm (e.g., an artificial intelligence algorithm, machine learning algorithm, etc.). In some embodiments, the network parameter(s) may include at least one cell parameter, handover parameter, or signal parameter. For example, the network management system, after analyzing the collected data from the fixed device (e.g., the fixed device 220), may determine the mobility profile corresponds to a stationary status (e.g., the fixed device is stationary in the fixed location 205 (e.g., a home) of a fixed wireless network).

In some embodiments, the network management system (e.g., the network management system 210) may apply a handover parameter (e.g., a handover threshold), cell activity timer, and/or any other suitable parameter(s) with different inputs (e.g., values). The network management system may dynamically adjust or otherwise adapt the parameter(s). Since the fixed device is not moving as much such that the fixed device may be serviced by the same cell site(s), the network management system may be more aggressive when setting the handover thresholds. In this regard, the fixed device remains in a coverage area of the cell site based on a handover threshold. For example, the fixed device may remain in a cell based on the handover threshold. The handover threshold may be calibratable between a handover threshold floor and handover threshold ceiling.

The fixed device may monitor signal strength(s) from the cell site the fixed device is serviced by and a neighbor cell site. If the signal strength is below an event trigger (e.g., a handover trigger), for example the signal strength is −100 dbm, the fixed device may provide a notification to the network management system to report the signal strength. In some embodiments, the network management system may allow the signal strength to drop to, for example −110 dbm, to permit the fixed device to remain in the cell even though the signal strength may be weaker.

In some examples, the network management system may generate a command to adapt one or more network resources based on the mobility profile. The network management system may generate the command to adapt a radio link based on the mobility profile. The command to adapt the network resource(s), radio link, etc. based on the mobility profile causes an increase in system efficiency. For example, the command may direct specific radio beams toward the fixed device (e.g., the fixed device 220) without making a beam adjustment. Since the fixed device is not moving or otherwise moving within the fixed location (e.g., the fixed location 205), the network management system may allow more aggressive handover thresholds which allow the fixed device to stay in the current cell longer as described herein.

In some examples, the fixed device (e.g., a laptop) may include an activity timer such that after a time period the radio link may de-activate. The user of the fixed device may not notice a difference in the performance of the fixed wireless network because the content may be stored in the cache of the fixed device. Advantageously, the activity timer of the fixed device (e.g., the fixed device 220) may be extended (e.g., the activity timer may be longer) since the battery life does not need to be saved. The latency may be decreased such that when the user clicks a button of the fixed device the delay in the performance of the fixed wireless network will be less (e.g., user clicking a button of a fixed device while at home gaming).

Advantageously, the adaptation of one or more network resources of a telecommunication network based on the mobility data saves the system signaling overhead associated with the adaptive beam forming and ensures link quality such that network performance impacts are reduced.

Figure 3:
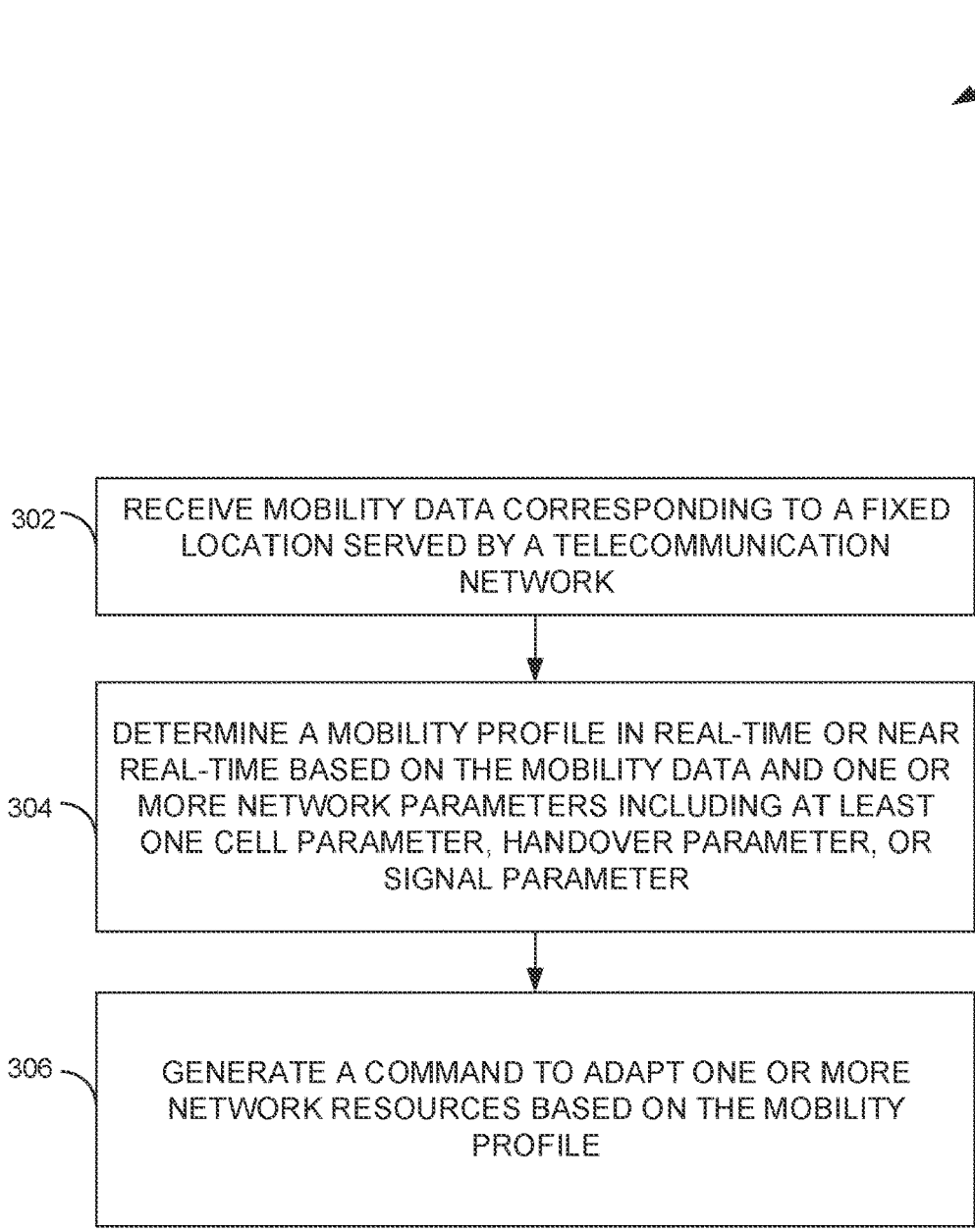
FIG. 3 depicts a flowchart of an exemplary method for adapting one or more network resources of a telecommunication network based on mobility data in accordance with an example embodiment.

FIG. 3 depicts a flow diagram of an exemplary method 300 for adapting one or more network resources of a telecommunication network based on mobility data, in accordance with implementations of the present disclosure. Initially at block 302 mobility data corresponding to a fixed location and the telecommunication network is received by the network management system. The network management system may receive mobility data corresponding to a home or any other suitable area within the range of a fixed wireless network.

At block 304, a mobility profile is determined in real-time or near real-time based on the mobility data and one or more network parameters including at least one cell parameter, handover parameter, or signal parameter. In this regard, the mobility profile may correspond to the one or more network parameters (e.g., cell parameter, handover parameter, signal parameter, etc.). The network management system may analyze the mobility data and/or the network parameter(s) according to a programmatic algorithm (e.g., a machine learning algorithm). The network management system may dynamically adjust or otherwise adapt the parameter(s). The fixed device may monitor signal strength(s) from one or more cell sites (e.g., the cell site the fixed device is serviced by and the neighbor cell site). If the signal strength is below a handover trigger, the fixed device may provide a notification to the network management system to report the signal strength. The network management system may allow the signal strength to drop to cause the fixed device to remain in a cell even though the signal strength may be weaker.

In some embodiments, a command to adapt one or more network resources is generated based on the mobility profile at block 306. In some examples, the command to adapt one or more network resources and/or a radio link based on the mobility profile may cause an increase in system efficiency.

For example, the network management system may allow more aggressive handover thresholds which allow the fixed device to stay in the current cell longer when the fixed device is not moving.

Figure 4:
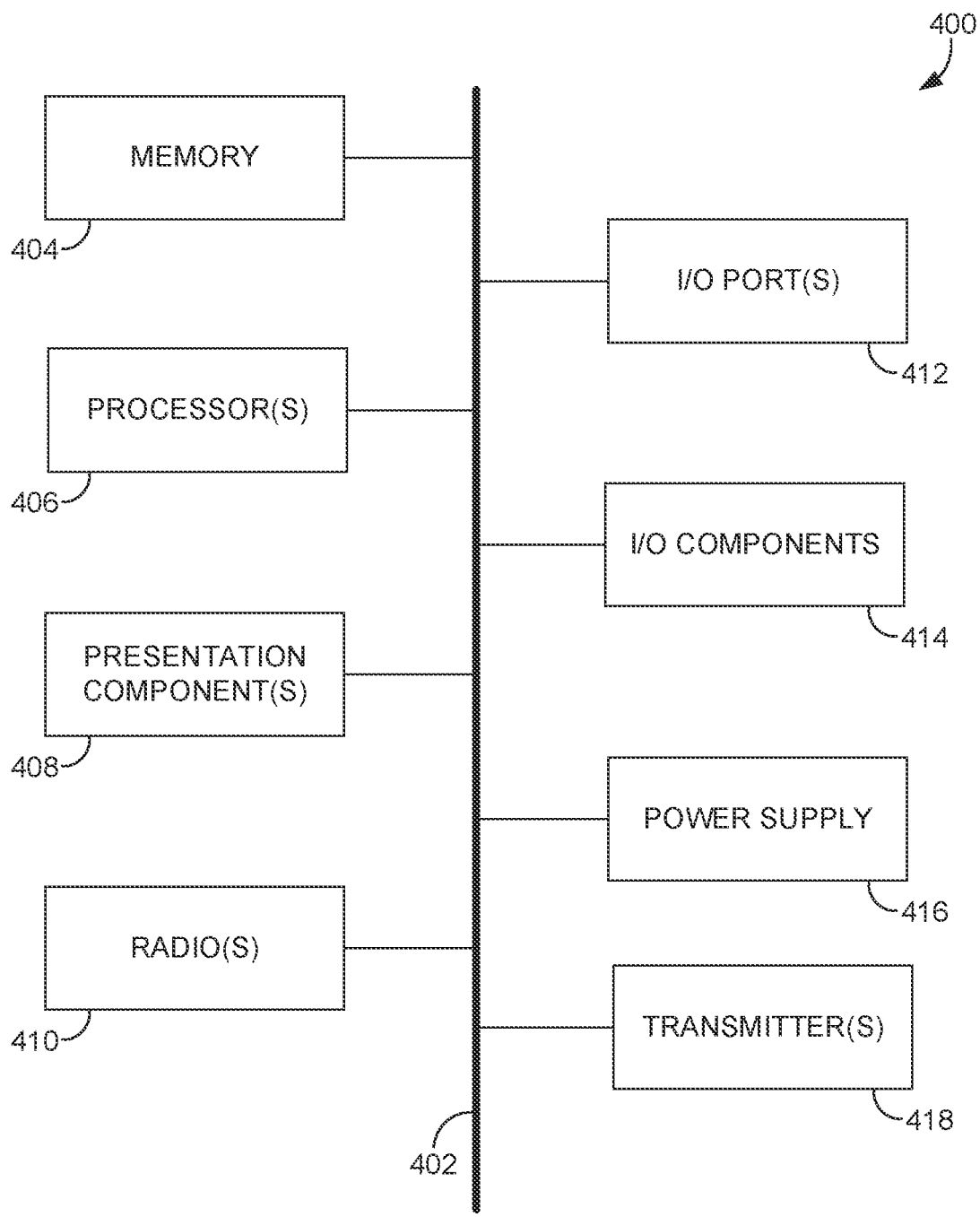
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunication technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for adapting one or more network resources of a telecommunication network based on mobility data, the method comprising:
   receiving, by a network management system communicatively coupled to at least one cell site and fixed device, mobility data corresponding to a fixed location served by a telecommunication network;
   determining a mobility profile in real-time or near real-time based on the mobility data and one or more network parameters comprising at least one cell parameter, handover parameter, or signal parameter; and
   generating a command to adapt one or more network resources based on the mobility profile;
   wherein the fixed device remains in a coverage area of a cell site based on a handover threshold, and wherein the handover threshold is calibratable between a handover threshold floor and handover threshold ceiling.

2. The method of claim 1, wherein the telecommunication network comprises a fixed wireless network.

3. The method of claim 1, wherein the fixed device comprises a user device.

4. The method of claim 1, wherein the mobility profile corresponds to the one or more network parameters.

5. The method of claim 1, wherein the network management system aggregates the mobility data.

6. The method of claim 1, wherein the network management system generates the command to adapt a radio link based on the mobility profile.

7. The method of claim 1, wherein the cell site is operable based on a RAN network.

8. The method of claim 1, wherein the cell site comprises the network management system.

9. Computer-readable storage media having computer-executable instructions embodied thereon that, when executed by one or more processors, cause the one or more processors to:
   receive, by a network management system communicatively coupled to at least one cell site and fixed device, mobility data corresponding to a fixed location served by a telecommunication network;
   determine a mobility profile in real-time or near real-time based on the mobility data; and
   generate a command to adapt one or more network resources based on the mobility profile,
   wherein the fixed device remains in a coverage area of a cell site based on a handover threshold, and wherein the handover threshold is calibratable between a handover threshold floor and handover threshold ceiling.

10. The computer-readable storage media of claim 9, wherein the telecommunication network comprises a fixed wireless network.

11. The computer-readable storage media of claim 9, wherein the fixed device comprises a user device.

12. The computer-readable storage media of claim 9, wherein the network management system is to generate the command to adapt a link based on the mobility profile.

13. The computer-readable storage media of claim 9, wherein the fixed device remains in a coverage area of a cell site based on a handover threshold.

14. A system for adapting one or more network resources of a telecommunication network based on mobility data, the system comprising:
   a cell site communicatively coupled to a network management system and a fixed device, the network management system to:
   receive mobility data corresponding to a fixed location served by a telecommunication network, the telecommunication network comprising a fixed wireless network;
   determine a mobility profile in real-time or near real-time based on the mobility data; and
   generate a command to adapt one or more network resources based on the mobility profile,
   wherein the fixed device remains in a coverage area of a cell site based on a handover threshold, and wherein the handover threshold is calibratable between a handover threshold floor and handover threshold ceiling.

15. The system of claim 14, wherein the fixed device comprises a user device.

16. The system of claim 14, wherein the mobility profile corresponds to one or more network parameters, and wherein the one or more network parameters comprise at least one cell parameter, handover parameter, or signal parameter.

17. The system of claim 14, wherein the network management system is to generate the command to adapt a link based on the mobility profile.

18. The system of claim 14, wherein the fixed location comprises at least one of a residential location or commercial location.

19. The system of claim 14, wherein the fixed device comprises an activity timer, and wherein a radio link is de-activated after a time period corresponding to the activity timer.

* * * * *